United States Patent [19]
Conrad

[11] 4,013,890
[45] Mar. 22, 1977

[54] CASSETTE

[76] Inventor: Raymond M. Conrad, 745 Woodruff Road, Milford, Conn. 06460

[22] Filed: Feb. 2, 1976

[21] Appl. No.: 654,581

[52] U.S. Cl. .................................. 250/480; 250/481
[51] Int. Cl.² ..................... G03D 13/08; G03C 3/00
[58] Field of Search ........... 250/475, 481, 482, 480

[56] References Cited

UNITED STATES PATENTS

| | | | |
|---|---|---|---|
| 2,530,321 | 11/1950 | Armstrong | 250/480 |
| 2,590,891 | 4/1952 | Reuter | 250/480 |
| 3,591,804 | 7/1971 | Mimasian | 250/476 |
| 3,704,369 | 11/1972 | Paidosh | 250/480 |

FOREIGN PATENTS OR APPLICATIONS

| | | | |
|---|---|---|---|
| 1,112,887 | 8/1961 | Germany | 250/481 |

*Primary Examiner*—Alfred E. Smith
*Assistant Examiner*—B. C. Anderson
*Attorney, Agent, or Firm*—McCormick, Paulding & Huber

[57] ABSTRACT

A cassette having a rectangular body made from plastic material including a marginal frame bounding a pair of film compartments separated by a radiation barrier and opening outwardly through opposite faces thereof. A pair of covers also made from plastic material and hingedly connected to opposite ends of the frame provide closures for the two film compartments. Each cover has a peripheral bead which is received within an associated groove in the frame when the cover is in a closed position. A U-shaped strip of magnetic material is sealed within each bead and cooperates with an associated U-shaped strip of magnetized material sealed within the body to releasably retain the cover in its closed position. The bead and groove further cooperate to comprise a light barrier for an associated film compartment.

9 Claims, 6 Drawing Figures

U.S. Patent  Mar. 22, 1977  4,013,890
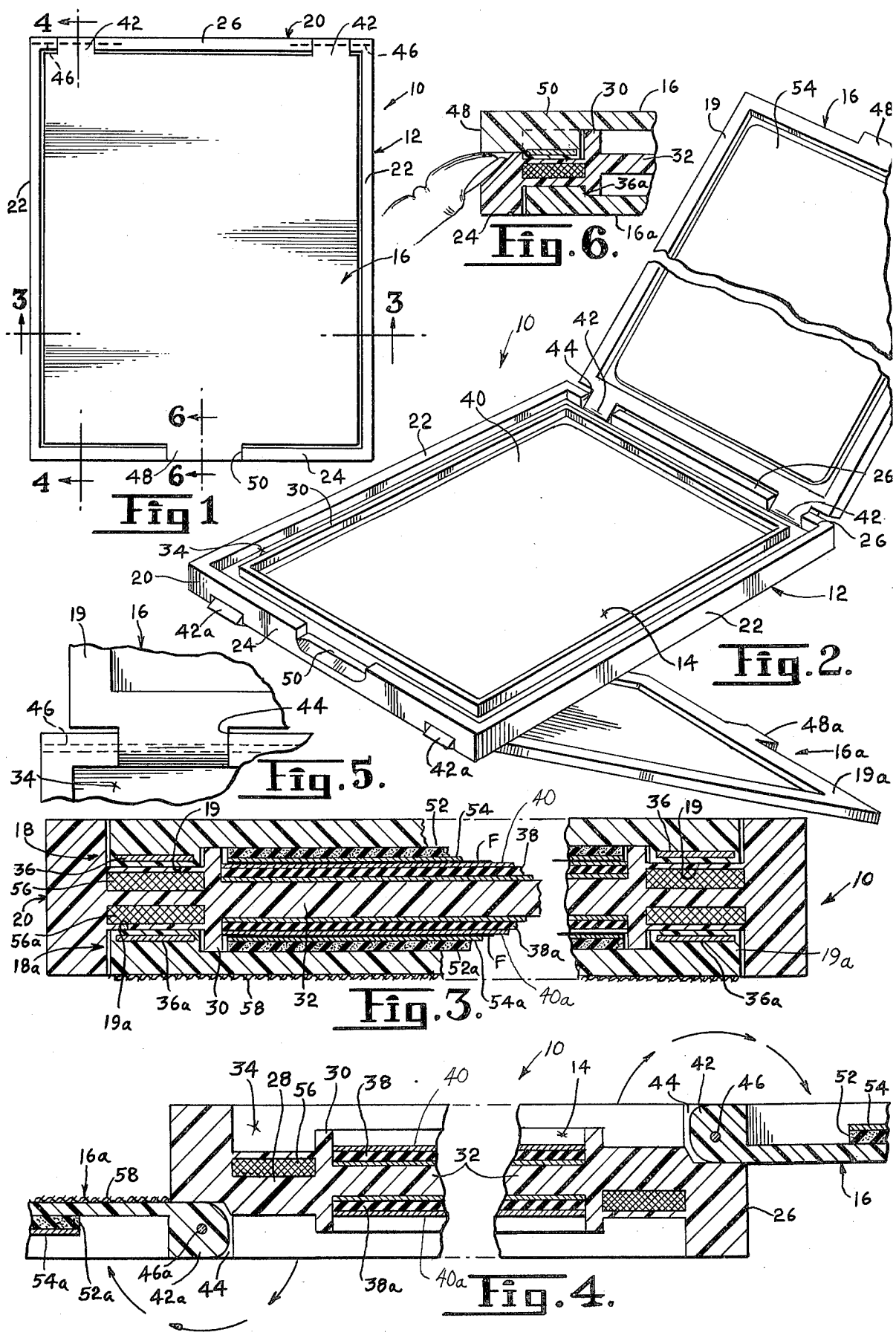

CASSETTE

BACKGROUND OF THE INVENTION

The invention relates in general to film holders or cassettes and deals more particularly with improvements in X-ray film cassettes.

In hospital facilities and the like where a large number of patients requiring radiological services are processed, it is particularly essential that X-ray cassettes used be of a type which facilitates the most efficient possible handling. Such cassettes must be of lightweight, durable, light-tight construction and adapted for rapid manipulation both in use and during film loading and unloading operations. It is self-evident that the time element involved in handling a cassette and processing film therefrom may be extremely critical in a medical emergency situation. Heretofore, various cassettes have been provided which include improved cover latches or the like to facilitate rapid manual manipulation in loading and unloading film. The present invention is directed to the further advance of the art through the provision of a cassette having all of the desirable features hereinbefore described while providing for improved cover retention without resorting to conventional latches and the like to facilitate more efficient handling, loading and unloading.

SUMMARY OF THE INVENTION

In accordance with the present invention, an improved cassette includes a body defining a film compartment and having a hinged cover providing a closure for said compartment. Magnetic means contained within the cover and body cooperate to releasably retain the cover in closed position in all positions of the cassette during normal handling. A peripheral bead on the cover which contains said magnetic means cooperates with a marginal groove in the body to provide a light barrier for said film compartment.

BRIEF DESCRIPTION OF THE DRAWINGS

FIG. 1 is a plan view of a cassette embodying the present invention.

FIG. 2 is a somewhat enlarged fragmentary perspective view of the cassette of FIG. 1 shown with the covers thereof in open position.

FIG. 3 is an enlarged fragmentary sectional view taken along the line 3—3 of FIG. 1 and shows the cassette in closed position with film therein.

FIG. 4 is an enlarged fragmentary sectional view taken along the line 4—4 of FIG. 1 but shows both cassette covers in fully open position.

FIG. 5 is an enlarged fragmentary plan view of the cassette of FIG. 1 shown with the cover thereof in an open position to further reveal the hinge structure.

FIG. 6 is a somewhat enlarged fragmentary sectional view taken along the line 6—6 of FIG. 1.

DETAILED DESCRIPTION OF THE PREFERRED EMBODIMENT

Turning now to the drawing, the referring particularly to FIGS. 1 and 2 thereof, an X-ray film cassette embodying the present invention and indicated generally by the reference numeral 10 comprises a body member indicated generally at 12 which has a pair of film compartments 14 and 14a opening outwardly through opposite faces thereof. A pair of panel members or covers indicated generally at 16 and 16a hingedly connected to the body member 12 and movable between open and closed positions relative thereto respectively provide closures for the first and second film compartments 14 and 14a. Magnetic means indicated generally at 18 and 18a, respectfully carried by the covers 16 and 16a and the body member 12 releasably retaining each cover in its closed position in all positions of the cassette 10 during normal handling. In the illustrated cassette 10, each cover has a strip of magnetic material sealed therein which cooperates with an associated strip of permanently magnetized material sealed within the body member to comprise the latter means. Each cover has a peripheral bead 19, 19a wherein the magnetic strip is sealed which cooperates with an associated groove to at least partially define a lighttight barrier around an associated film compartment as will be hereinafter further discussed.

Considering now the cassette 10 in further detail and as oriented in the drawing, the body member 12 is preferably molded from light-weight durable high impact plastic material and includes a rectangular marginal frame indicated generally at 20 which has side walls 22, 22 and end walls 24 and 26. An integral generally horizontally disposed continuous central web 28 projects inwardly from the side and end walls, as best shown with reference to a typical cross-section of the frame 20 as it appears in FIGS. 3 and 4. The inner boundary of the frame 20 is defined by a continuous vertically disposed rib 30 integrally connected to the web 28. The rib 30 extends for some distance above and below the web, as best shown in FIGS. 3 and 4. The body member 12 also has an integral horizontally disposed central dividing wall 32 within the boundary of the frame 20 which cooperates with the rib 30 to define the film compartments 14 and 14a. The side and end walls of the frame 20 cooperate with the web 28 and the rib 30 to define an upwardly opening groove 34 which forms a boundary around the upper film compartment 14 and another groove 34a which bounds the lower film compartment 14a. At least one strip of permanently magnetized material 36 is embedded in the body closely adjacent the inner wall of the groove 34 and extends at least partially therearound. In the illustrated case, the strip 36 is generally U-shaped and is embedded in the web 28 adjacent the side walls 22,22 and the end wall 24. In like manner, another strip of magnetic material 36a is embedded in the body member 12 within the web 28, substantially as shown in FIGS. 3 and 4, for a purpose hereinafter further discussed.

Since the present cassette is particularly adapted for radiological use, it is essential that a suitable radiation barrier be provided between the upper and lower film compartments 14 and 14a. In accordance with the presently preferred construction, relatively thin rectangular sheets of lead are employed for this purpose. A lead sheet indicated at 38 is contained within the upper film compartment 14. Another sheet of like material designated 38a is similarly disposed within the lower film compartment 14a. Intensifying screens 40 and 40a are respectively mounted within the upper and lower film compartments 14 and 14a to define film support surfaces within the film compartments, as is well known in the art.

The two covers are substantially identical and each is preferably connected to an opposite end wall of the body member by at least one integral hinge. A typical cover 16 is preferably made from a light-weight durable plastic material which may be identical to the material from which the body is made. It is generally rectangular, adapted to be received within the boundary of the marginal frame 20, and includes a pair of transversely spaced apart integral hinge portions 42, 42 which extend outwardly beyond the peripheral edge thereof. Each hinge portion 42 is received in a complementary notch 44 formed in the frame end wall 26 and is connected to the body member 12 by an associated hinge pin 46. The cover 16 also includes an integral handle portion 48 which projects outwardly beyond the peripheral edge thereof opposite the hinge portions 42,42. The handle portion 48 is received in an associated notch 50 formed in the frame end wall 24. The outer edge of the notch 50 is relieved or cut away for finger access when the cover 16 is in its closed position, as illustrated in FIG. 6.

The cover 16 has a resilient pressure pad 52 made from sponge rubber or like material which is mounted on the inner surface thereof and received in the film compartment 14 when the cover is in its closed position. An intensifying screen 54 carried by the pad 52 cooperates with the screen 40 to retain a film, such as indicated at F, in a secure position therebetween when the cassette 10 is in its closed and loaded condition.

Considering now the magnetic means 18 for releasably retaining the cover 16 in its closed position, the latter means comprises a strip of magnetic material designated by the numeral 36 and sealed within the bead 19 in close proximity to the inner surface of the bead. In the illustrated case, the strip 36 is generally U-shaped and is embedded in the bead and extends along the side edges and the handle end of the cover 16 as best shown in FIG. 2. However, the illustrated strip 36 does not extend along the hinged end of the cover. The bead 19 has a generally rectangular cross-sectional configuration to generally complement the cross-sectional configuration of the groove 34 in which it is received. The magnetic strip 36 cooperates in magnetically coupled relation with the magnetized strip 56 embedded in the body of the cassette when the cover 16 is in its closed position. Thus, the cover 19 is releasably retained in its closed position by magnetic force. The bead 19 cooperates with the groove 34 to comprise a light-tight barrier for the film compartment 14.

The construction and arrangement of the lower cover 16a is substantially identical to that of the cover 16; however, it should be noted that the cover 16a is hingedly connected to the opposite end of the frame, or more specifically to the end wall 24. Each cover in its closed position together with its integral hinges and handle cooperate with the frame 20 to define a substantially continuous or uninterrupted planar surface which comprises an associated face of the cassette. A friction pad such as indicated at 58 may be provided on the outer surface of either or both covers as desired.

It will now be evident that cassette weight has been substantially minimized through the efficient utilization of light-weight materials, the elimination of cover latching mechanism and the dual function of cassette parts.

I claim:

1. A cassette comprising a generally rectangular body member having a generally rectangular marginal frame and an outwardly facing film support surface within the boundary of said marginal frame and cooperating therewith to define a film compartment opening outwardly through one face of said body member, said marginal frame having a continuous groove formed therein surrounding said film compartment, said groove opening outwardly through said one face, a generally rectangular panel member hingedly connected to one end of said marginal frame for movement between open and closed positions relative to said film compartment, said panel member in its closed position generally overlying said film support surface and cooperating with said marginal frame to define a substantially smooth planar surface comprising said one face, said panel member having a continuous rectangular bead at its peripheral edge received within said groove when said panel member is in its closed position and comprising a light-tight barrier around said film compartment, and magnetic coupling means for releasably retaining said panel member in its closed position and comprising strips of material including a strip of magnetic material and a strip of magnetized material, one of said strips embedded in said frame inwardly of the outwardly facing inner surface of said groove and wholly surrounded by the material of said frame, the other of said strips embedded in said bead outwardly of the inwardly facing surface of said bead and wholly surrounded by the material of said panel.

2. A cassette as set forth in claim 1 wherein each of said strips which comprising said magnetic coupling means is further characterized as a generally U-shaped strip.

3. A cassette as set forth in claim 2 wherein said one strip extends along three sides of said rectangular groove and said other strip extends along three sides of said bead in generally opposing relation to said one strip when said panel member is in its closed position.

4. A cassette as set forth in claim 3 wherein said one strip comprises said magnetized material and said other strip comprises said magnetic material.

5. A cassette comprising a generally rectangular body member having a generally rectangular marginal frame and an outwardly facing first film support within the boundary of said marginal frame and cooperating therewith to define a first film compartment opening outwardly through one face of said body member, said body member having an outwardly facing second film support surface within the boundary of said marginal frame and cooperating therewith to define a second film compartment opening outwardly through the opposite face of said body member, said marginal frame having first and second continuous rectangular grooves formed therein respectively surrounding said first and second film compartments, said first groove opening outwardly through said one face, said second groove opening outwardly through said opposite face, a generally rectangular first panel member hingedly connected to one end of said marginal frame for movement between open and closed positions relative to said first film compartment, said first panel member in its closed position generally overlying said first film support surface and cooperating with said marginal frame to define a substantially smooth planar surface comprising said one face, said first panel member having a continuous rectangular first bead at the peripheral edge thereof received within said first groove when said first panel member is in its closed position and comprising a light-tight barrier around said first film compartment, a generally rectangular second panel member hingedly connected to the other end of said marginal frame opposite said one end for movement between open and closed positions relative to said second film compartment, said second panel member in its closed position generally overlying said second film support surface and cooperating with said marginal frame to define a substantially smooth planar surface comprising said opposite face, said second panel member having a continuous rectangular second bead at the peripheral edge thereof received within said second groove when said second panel member is in its closed position and comprising a light-tight barrier around said second film compartment, and magnetic coupling means for releasably retaining said first and second panel members in closed position and comprising a plurality of strips of material, at least one of said strips embedded in said frame between said first groove and said second groove and wholly surrounded by the material of said frame, said strips further including a first strip embedded in and wholly surrounded by the material of said first bead and a second strip embedded in and wholly surrounded by the material of said second bead, said first strip cooperating in magnetically coupled relation with said one strip to releasably retain said first panel member in its closed position, said second strip cooperating in magnetically coupled relation with said one strip to releasably retain said second panel member in its closed position.

6. A cassette as set forth in claim 5 wherein each of said strips is further characterized as a generally U-shaped strip.

7. A cassette as set forth in claim 5 wherein said strips includes two strips embedded in said frame between said first and second grooves, one of said two strips cooperating in magnetically coupled relative with said first strip to releasably retain said first panel member in its closed position, the other of said two strips cooperating in magnetically coupled relation with said second strip to releasably retain said second panel member in its closed position.

8. A cassette as set forth in claim 5 wherein said one strip comprises a magnet and said first and second strips comprise magnetic material.

9. A cassette as set forth in claim 5 wherein each one of the panel members has at least one integral hinge portion which extends outwardly beyond a peripheral edge thereof and is received in an associated notch in said marginal frame to hingedly connect said one panel member to said frame, each one of the panel members has an integral handle portion which extends outwardly beyond a peripheral edge thereof opposite said one hinge portion and is received in an associated notch in said marginal frame when said one panel member is in its closed position, and wherein each said integral hinge portion and each said integral handle portion cooperates with said marginal frame and an associated one of said panel members to define an associated one of said substantially smooth planar surfaces which comprise the faces of said cassette.

* * * * *

UNITED STATES PATENT OFFICE
CERTIFICATE OF CORRECTION

Patent No. 4,013,890      Dated March 22, 1977

Inventor(s) Raymond M. Conrad

It is certified that error appears in the above-identified patent and that said Letters Patent are hereby corrected as shown below:

Column 6, (claim 7) line 4, delete "relative" and substitute --relation--.

Signed and Sealed this

Thirty-first Day of May 1977

[SEAL]

Attest:

RUTH C. MASON
*Attesting Officer*

C. MARSHALL DANN
*Commissioner of Patents and Trademarks*